March 17, 1959 E. W. HEBESTREET ET AL 2,877,599
SOIL CONDITIONER AND PROCESS UTILIZING CARBON BLACK
Filed Aug. 2, 1954 2 Sheets-Sheet 1
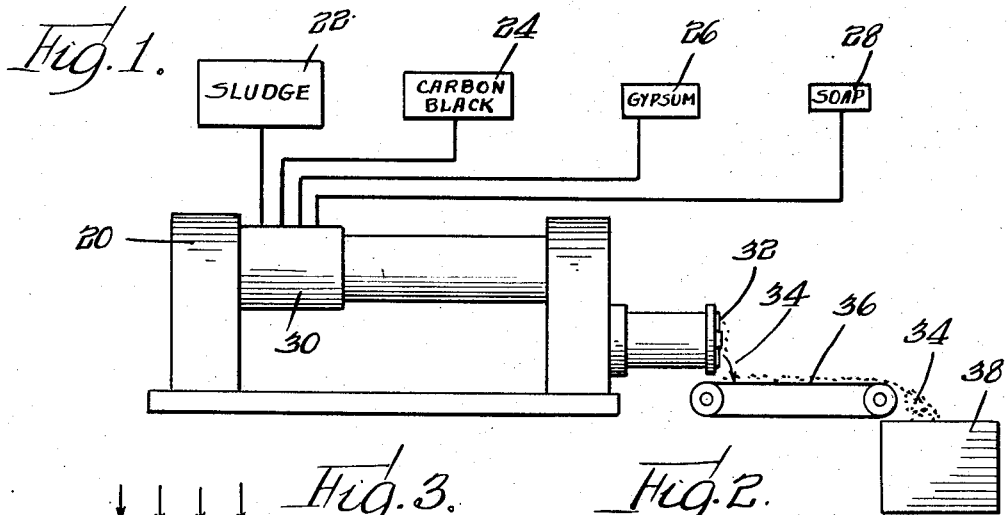
Fig. 1.
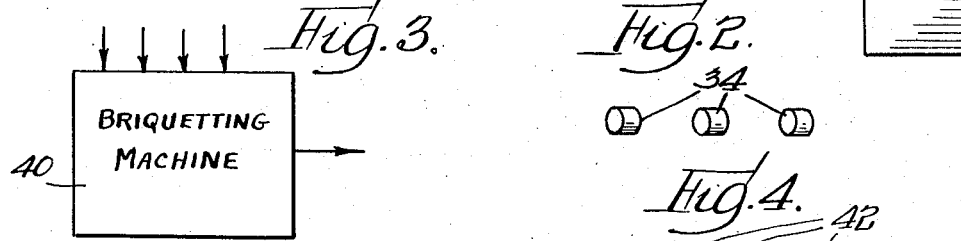
Fig. 3. Fig. 2.
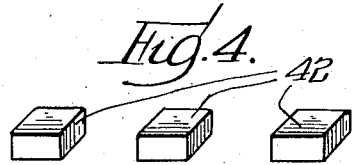
Fig. 4.
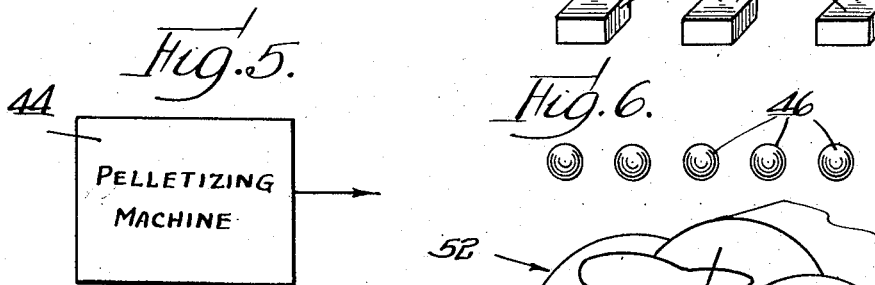
Fig. 5.
Fig. 6.
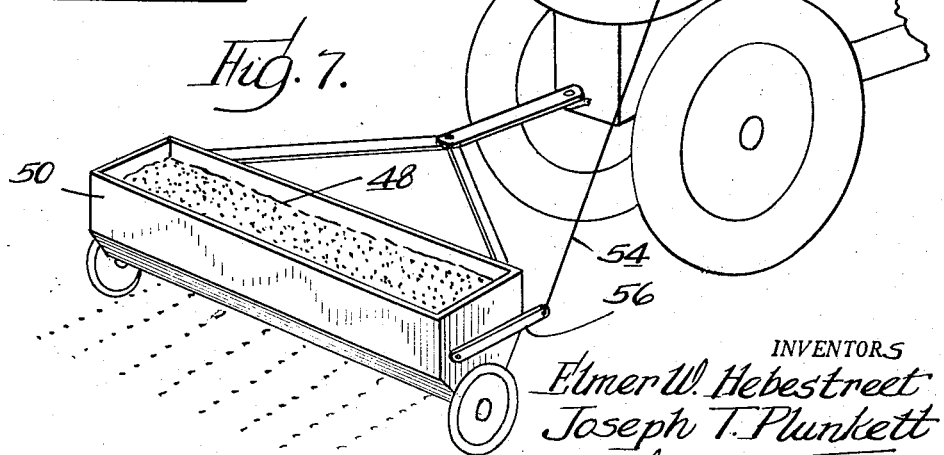
Fig. 7.
INVENTORS
Elmer W. Hebestreet
Joseph T. Plunkett
By: Olson & Trexler attys March 17, 1959 E. W. HEBESTREET ET AL 2,877,599
SOIL CONDITIONER AND PROCESS UTILIZING CARBON BLACK
Filed Aug. 2, 1954 2 Sheets-Sheet 2
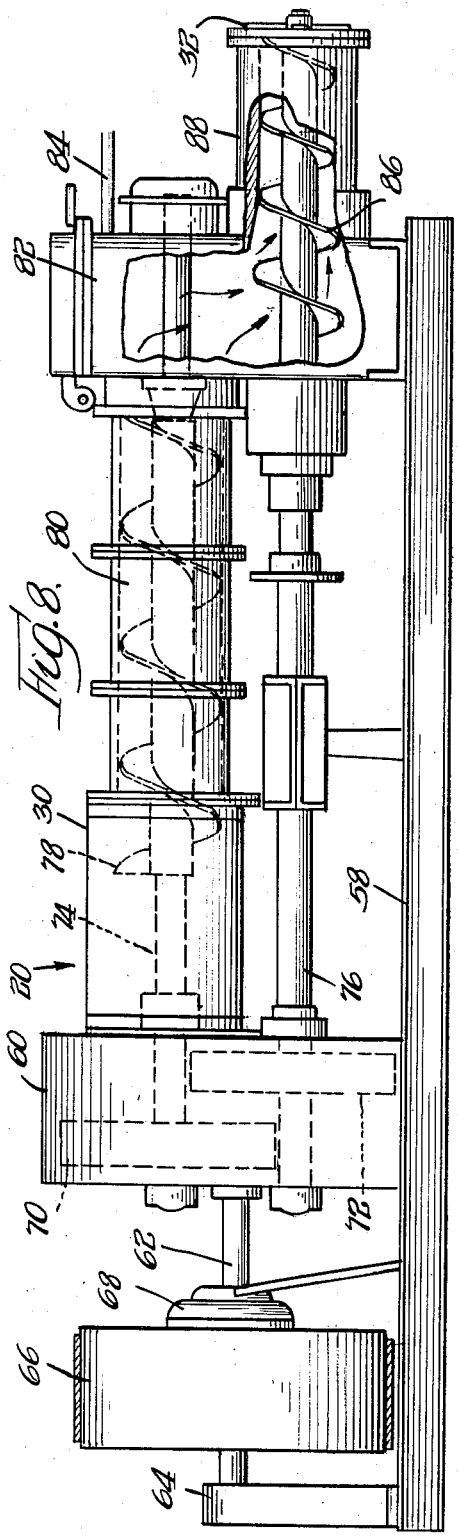
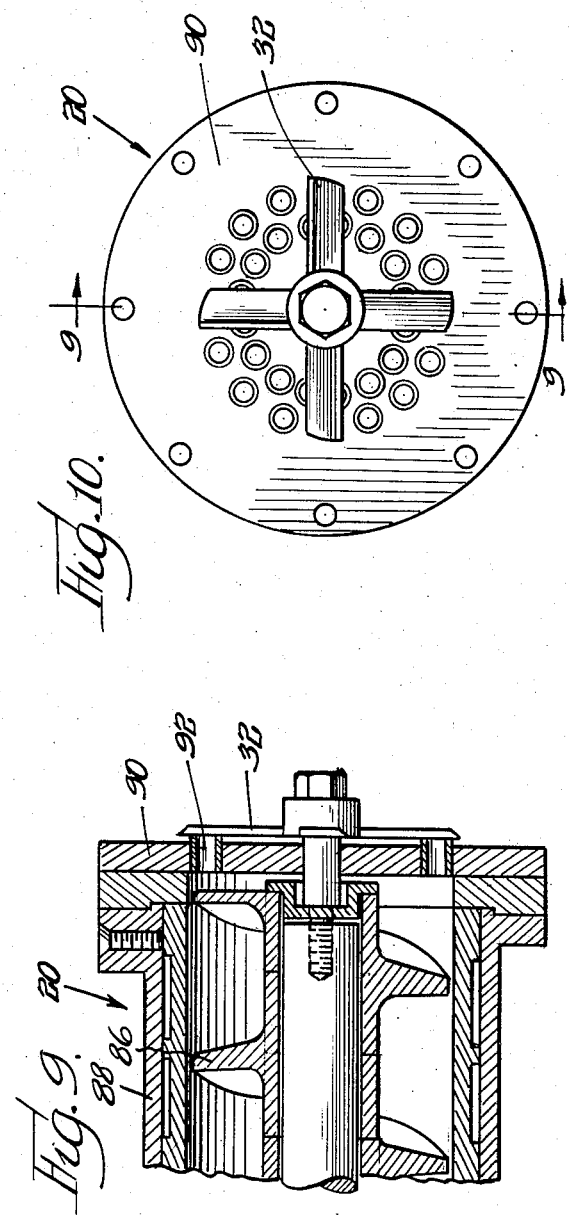
INVENTORS
Elmer W. Hebestreet
Joseph T. Plunkett
By: Olson & Trexler attys.

United States Patent Office
2,877,599
Patented Mar. 17, 1959

2,877,599
SOIL CONDITIONER AND PROCESS UTILIZING CARBON BLACK

Elmer W. Hebestreet, Evanston, and Joseph T. Plunkett, Chicago, Ill.; said Plunkett assignor to said Hebestreet Application August 2, 1954, Serial No. 447,302

15 Claims. (Cl. 47—9)

This invention is concerned generally with a soil conditioner, and particularly with means and methods for applying carbon black to the soil.

When crops are planted in temperate zones in the springtime, and also what few crops are grown in frigid or arctic regions, the days are rather short, and the sun's rays strike the ground at a shallow angle. As a result, the soil does not get very warm in the daytime, and cools quickly at night. Seed germination thus is slow, and early root growth is slow and weak.

Furthermore, many soils are not capable of absorbing and retaining the heavy spring rainfalls. In many instances most of the water may run off, and that that does not run off is not long retained by the soil, thus further militating against rapid germination and vigorous root growth.

Accordingly, it is an object of this invention to condition the soil to speed seed germination and promote a vigorous root growth.

It further is an object of this invention to condition the soil for improved heating from solar radiation and for improved absorption and retention of water.

More specifically, it is an object of this invention to add carbon black to the soil to improve absorption of solar radiation and to facilitate the absorption and retention of water.

It has been recognized that darkening soil improves the heating thereof from the sun. However, heretofore it has been impossible to darken the soil satisfactorily. Substances suitable for gardening have been too expensive, or have been practically impossible to add to the soil, or have rendered the soil unsatisfactory for plant growth in other respects. Carbon black, which is commercially derived as a sooty product from natural gas or from other sources as is well known, has a very high volume for its weight and thus theoretically would be satisfactory for incorporation in the soil to darken the soil. However, the carbon black is so light and fluffy, in a sense being highly volatile, that it cannot be deposited directly on the ground. Merely dropping it causes a substantial percentage of the carbon black to "evaporate" into the air, while the remainder of it is rapidly carried away or drifted by the wind. Carbon black has a further advantage of breaking up the soil and rendering it more porous, without any undesirable side effects such as adding lumps or granules to the soil such as would impede the growth of vegetation. However, it heretofore has been practically impossible to add carbon black to the soil for the reason pointed out above, namely that the carbon black is too "volatile."

Therefore, it is an object of this invention to combine carbon black with a carrier or dispersing agent and thereby to add the carbon black to the soil.

More specifically, it is an object of this invention to mix carbon black with a solid or plastic carrier or dispersing agent which will release the carbon black in and on the soil as a result of weathering.

A further object of this invention is to provide a method of conditioning soil with carbon black and a carrier or dispersing agent or agents which themselves are of value to soil.

Yet another object of this invention is to provide a novel product incorporating carbon black for addition to soil for conditioning the same.

Still another object of this invention is to provide a novel product incorporating carbon black and other soil conditioning agents or additives which will be incorporated into the soil by weathering.

Other and further objects and advantages of the present invention will be apparent from the following description when taken in connection with the accompanying drawings wherein:

Fig. 1 is a somewhat schematic diagram illustrating the manufacture of our improved soil conditioner;

Fig. 2 is a perspective view of the soil conditioner in a preferred form;

Fig. 3 illustrates schematically an alternative means and method of manufacturing the soil conditioner;

Fig. 4 is a perspective view illustrating a modified form of the soil conditioner;

Fig. 5 is another schematic view illustrating a further modified means and method of producing our soil conditioner;

Fig. 6 is a view of a further modified form of the soil conditioner;

Fig. 7 is a fragmentary perspective view illustrating the addition of the soil conditioner to the ground;

Fig. 8 is an elevational view with parts broken away of a machine for manufacturing the soil conditioner in accordance with Fig. 1;

Fig. 9 is a fragmentary longitudinal sectional view thereof as taken along the line 9—9 in Fig. 10; and Fig. 10 is an end view of the discharge end of the machine.

In accordance with the principles of our invention, the carbon black is mixed with a fibrous organic material, preferably one having a fertilizing value, and also preferably is mixed with gypsum, and may incorporate a water soluble binder. A scent may be added to impart any desirable odor, such as a creosote or Lysol odor to suggest cleanliness, or perhaps a hickory odor for the olefactory pleasure afforded thereby.

In accordance with a preferred embodiment of the invention, the carbon black is mixed with sludge from sewage processing plants, with gypsum, and with a water soluble binder. The sludge acts to hold the carbon black together so that it will not blow away, and adds fiber and organic materials to the soil, thus conditioning the soil in addition to the improved heat absorption and water absorption and retention imparted to the soil by the carbon black. The sludge may be expected to have from 3% to 8% nitrogen, 2% to 5% phosphorus and .2 to .4% potash. Gypsum also is added for the value it imparts to the soil, and also inasmuch as it makes the soil conditioner more plastic, and hence easier to work with.

In addition, a small amount of soap or detergent may be added as a water soluble binder. The soap or detergent preferably would be used when the soil conditioner is to be used where dew or rainfall might be expected to dissolve the soap or detergent to cause the soil conditioner to break up for addition to the soil. In dryer regions the soap or detergent would be omitted, and air would be incorporated in the soil conditioner so that it would break up readily from physical forces such as tractor tires or tilling apparatus, or simply from thermal expansion and contraction due to solar heating during the day and cooling during the night.

The minimum desirable percentage of carbon black in the soil conditioner would be on the order of about 5%, this percentage making the soil conditioner about as black as it can get. However, with increased concentrations of carbon black the soil conditioner can be spread out thinner to give the desired degree of blackness to the soil. An upper economic limit of about 40% carbon black has been established, and the preferred range is about 10% to 20%. The gypsum may be omitted, but it is preferred to include it, and the gypsum may run to 50% of the total mix. A wide variation in sludge content is permissible, and may run from substantially zero to approaching 100%.

In actual tests it has been found that the soil conditioner would be spread on the soil in quantity ranging from 200 pounds to two tons per acre in accordance with soil conditions and requirements, and in accordance with the concentration of carbon black in the soil conditioner.

The carbon black is essential. Other organic material than sludge could be used, such as the waste liquor from paper mills, or humus. The gypsum, as is well known, is a hydrous sulphate of lime, and is valuable for adding calcium and sulphate to the soil.

The soap may be replaced by a soluble salt such as ammonium sulphate or urea, or it may be omitted completely for arid climates as heretofore has been indicated.

Referring now in greater detail to the drawings, there will be seen in Fig. 1 a schematic diagram illustrating a preferred method of formation of our improved soil conditioner. An extrusion machine is provided as indicated at 20. Sludge from a source 22, carbon black from a source 24, gypsum from a source 26, and soap or detergent from a source 28 are deposited in a hopper 30 of the extrusion machine. The ingredients are thoroughly mixed in the extrusion machine 20 as hereinafter will be brought out in greater detail, and are extruded in the form of rods which are cut off by a rotating knife 32 at the discharge end of the machine to form cylindrical pellets 34 as indicated in Fig. 2. These pellets preferably are cut to a length substantially equal to their diameters, and this dimension may be on the order of ¼ to ³⁄₁₆ of an inch. The extruded soil conditioner has a consistency about the same as half wet spaghetti, and hence is readily cut by the knife or blade 32.

The pellets 34 quickly harden in the air. The pellets dropped from the extruding machines may be received on a conveyor belt 36 for carrying in the air to harden them until they are dropped into a container 38.

A modification of the process of manufacturing the soil conditioner, and of the physical configuration of the soil conditioner itself are shown in Figs. 3 and 4. Rather than utilizing an extrusion apparatus as in Fig. 1, the mixed ingredients are placed in a briquetting machine indicated at 40. It will be understood that this briquetting machine is of a type readily available in commerce and hence requiring no extended description. The briquetting machine may incorporate suitable mixing apparatus so that the ingredients may be added separately. The briquettes 42 from the machine as illustrated in Fig. 4 take the form of relatively flat square blocks, being on the same order of magnitude as the pellets 34. However, the pellets could take any other well-known briquette form, such as cubical, cylindrical, oblong, or pill-shaped. Preferably, all of the dimensions would be nearly the same to prevent bridging and clogging of a spreading apparatus.

As a further alternative, the ingredients could be placed in a pelletizing machine 44 of a well-known type readily known in commerce and indicated schematically in Fig. 5. As is well-known, a pelletizing machine swirls the particles of the ingredients around rapidly until they agglomerate into pellets of a predetermined size and of generally spherical configuration, as indicated at 46 in Fig. 6. It will be understood that the ingredients readily could be mixed in the pelletizing machine. The spherical pellets 46 preferably are of substantially the same size as the cylindrical pellets 34 and the briquettes 42, i. e. about ¼ to ³⁄₁₆ of an inch in diameter.

The cylindrical and spherical pellets, and also the briquettes come within the broad definition of "pellet," and this term hereinafter will be used generically to cover the various physical forms of the soil conditioner unless otherwise limited.

The pellets of whatever shape are handled as a mass of soil conditioner 48 which may be deposited in a seeder or fertilizer spreader 50 as indicated in Fig. 7. For yards or the like the spreader may be pushed or pulled by hand, but for large scale agricultural uses it preferably would be power operated, being drawn by a tractor indicated generally at 52 in Fig. 7. A cord or the like 54 is utilized to operate the release lever 56 of the spreader 50 from the tractor. The exact thickness of the layer of soil conditioner 48 to be deposited on the ground necessarily would have to be determined in accordance with local conditions. It is desirable eventually that the soil conditioner should work into the ground to a depth of two inches over a period of years, but no special working of the soil is necessary for this purpose as rain and soil moisture will carry the carbon black directly into the soil, and the gypsum also is very helpful in carrying the carbon black into the soil.

It will be noted that the carbon black has a neutralizing effect on soil temperature. In the early springtime the blackness imparted to the soil by the carbon black will materially increase heating of the soil during the day to speed seed germination and growth during the day. The higher temperature consequently reached by the soil maintains the soil at a higher temperature at night so that germination and growth can continue even after dark. However, later in the year when the days are longer, the sun is more directly overhead, and rainfall is less, the soil is shaded by the vegetation growing therefrom, and the carbon black does not cause the soil to be heated from solar radiation during such time of year. In fact, it has been found that the shaded ground actually is somewhat cooler during the hot summer months with the carbon black incorporated in it than it is without the carbon black. In connection with the solar heating of the soil in the spring by virtue of the carbon black, it should be stated that germination and early root growth has been promulgated in actual tests to an extent to advance the plants or crops several days, or even weeks, ahead of what they would be without the carbon black, and days gained in the springtime during early growth result in weeks gained in harvest, thereby avoiding danger of autumnal frosts. It will be noted that the increased heating of the soil through incorporation of the carbon black in large measure serves to eliminate the danger of late springtime frost.

Referring now to Figs. 8, 9, and 10, there will be seen more detailed views of the extruding machine 20 previously mentioned with regard to Fig. 1. The machine comprises a frame or base 58 on which is mounted a transmission housing 60. A drive shaft 62 extends from this housing, being journaled in the housing and in a standard 64 upstanding from the end of the base. A pulley 66 is mounted on the shaft 62 for driving the shaft from any suitable power source when a clutch 68 of any known or suitable design is engaged.

The shaft 62 enters the housing off center thereof and is provided with suitable gears to engage larger gears 70 and 72 for driving a pair of shafts 74 and 76 respectively, preferably in the same direction. The shaft 74 extends into the hopper 30 previously mentioned and has a helical feed screw 78 thereon. This helical feed screw, illustrated simply as a continuous screw, but which might be an interrupted screw supported periodically in suitable bearings or provided with baffles of one sort or another, extends through a cylindrical housing 80 into an evacuating chamber 82 connected through a suitable conduit 84 into a vacuum source. The majority of the air entrapped in the ingredients is removed at this stage in accordance with a preferred embodiment of our process or method to produce a compact product. More particularly, the air is evacuated when soap or detergent, or a soluble salt or the like is incorporated in the mix. Dissolving of such soluble material breaks up the resulting pellets after application to the ground. The pellets produced in this manner are hard and coherent as well as compact, thus being subject to a minimum of breaking up during shipping.

When the soil conditioner pellets are to be used in arid or semi-arid locations, or in other locations of scant or unreliable rainfall, it is not desirable to make the pellets so compact, hard, and coherent. The soap in this instance may be omitted and physical activity may be relied on to break up the pellets, as has been indicated previously. In order to facilitate such breaking up the evacuating step is dispensed with to leave air entrapped in the material as it is fed and mixed by the screw 78. In fact, in some instances the vacuum line 84 might be connected to an air-pressure source to introduce extra air into the material to make pellets that readily will crumble.

A discharge screw 86 is mounted on or driven by the shaft 76 in a cylindrical housing or chamber 88 positioned in part directly beneath the evacuating chamber and receiving the mixed ingredients therefrom. The cylindrical chamber 88 is terminated by a perforated plate 90 and the screw 86 extrudes the mixed material through the perforations. As will be observed these perforations preferably are formed by sleeves or bushings 92 set into the plate. The knife 32 previously mentioned is mounted on the outer face of the plate 90 and is driven by the shaft 76 or screw 86, either directly as shown, or through suitable gearing, the number of blades or cutting elements of the knife 32 and the speed of rotation of the knife being determined in accordance with the speed at which the mixed material is extruded through the slevees 92 to cut rods extruded thereby into the cylindrical pellets 34 as heretofore indicated.

We have now disclosed our invention comprising in its over-all aspects the addition of carbon black to the soil, and more specifically and in subcombinations comprising the process of incorporating carbon black in a soil conditioner in such form that the carbon black can be added to the soil; the process of adding carbon black to the soil along with suitable binding and dispersing agents to prevent the carbon black from blowing away; as well as the soil conditioner as an article of manufacture.

The carbon black aids the soil to absorb the sun's rays for heating of the soil, therefore speeding germination and encouraging heartier early root growth and substantially avoiding the dangers of late frost. There also is evidence that the carbon black helps to retain moisture in the soil and helps to break up the soil. The sludge or other organic material and/or the gypsum mixed in with the carbon black produce a solid substance which does not blow away, but which readily breaks down and assimilates into the soil. Additional benefits or bonuses are derived from these substances in the fertilizing value of the sludge or organic material, and the soil conditioning action of the gypsum.

The specific examples herein shown and described are to be understood as being illustrative only. Various changes therein may occur to those skilled in the art and will be understood as forming a part of our invention insofar as they fall within the spirit and scope of the appended claims.

We claim:

1. The process of preparing a soil conditioner which comprises intimately mixing carbon black with fibrous organic material and gypsum under selective predetermined quantitative control of entrapped air, and forming the resulting mixture into discrete coherent pellets adapted for spreading on the ground and weathering into the soil.

2. The process of preparing a soil conditioner as set forth in claim 1 wherein the pellets are formed by briquetting the mixture.

3. The process of preparing a soil conditioner as set forth in claim 1 wherein the pellets are formed by swirling the mixture around to agglomerate the mixture into pellets.

4. The process of preparing a soil conditioner as set forth in claim 1 including the further step of aerating before forming the mixture into pellets.

5. A soil conditioner pellet comprising a compact mixture of carbon black, organic fibrous material, and gypsum prepared in accordance with the method of claim 1.

6. The process of preparing a soil conditioner which comprises mixing carbon black with fibrous organic material and gypsum, and extruding the resulting mixture and interrupting the extrusions to form coherent pellets adapted for commercial distribution.

7. The process of preparing a soil conditioner which comprises mixing carbon black with fibrous organic material and gypsum, deaerating the mixture, and forming the resulting mixture into coherent pellets adapted for commercial distribution.

8. The process of preparing a soil conditioner as set forth in claim 7, and further including the mixing in of water soluble binder before deaeraton.

9. The process of adding carbon black to the soil without substantial dissipation of the carbon black, which comprises forming a non-liquid intimate mixture of carbon black and a binder which prevents blowing away of the carbon black, spreading the resulting mixture on the ground without previous alteration of the binder, and allowing the spread carbon black to weather into the ground from the mixture.

10. The process of conditioning soil which comprises spreading on the ground an intimate mixture of carbon black and a binder in pellet form having predetermined controlled quantity of entrapped air, and allowing the pellets to weather under prevailing climatic conditions to carry the carbon black into the soil.

11. The process of conditioning soil with an intimate mixture of carbon black, fibrous organic material, and gypsum in pellet form having selective predetermined quantity of entrapped air, by spreading the pellets on the ground, and allowing the pellets to weather and carry the carbon black into the soil.

12. The process of conditioning soil which comprises spreading on the ground a pelletized intimate mixture of carbon black, fibrous organic material, gypsum, and a water soluble binder which prevents blowing away of the carbon black, and allowing the pelletized mixture to weather into the soil.

13. The process of preparing a soil conditioner adapted for spreading on the ground and weathering into the soil which comprises mixing under conditions of controlled deaeration carbon black with a fibrous organic material, with gypsum, and with a water soluble binder to prevent blowing away of the carbon black, and wherein the carbon black comprises substantially 5% to 40% of the total mixture the gypsum up to 50% of the total mixture, the binder less than 1% of the total mixture, and the fibrous organic material being present in a percentage to make up the remainder of the mixture.

14. A soil conditioner in compact pellet form and comprising an intimate mixture with predetermined quantity of entrapped air of carbon black, organic fibrous material, gypsum, and a water soluble binder, wherein the carbon black comprises from 5% to 40% of the total mixture, the gypsum up to 50% of the mixture, the binder up to 1% of the mixture, and the organic fibrous material up to substantially 95% of the total mixture.

15. A soil conditioner as set forth in claim 14 wherein the carbon black comprises from 10% to 20% of the total mixture.

References Cited in the file of this patent

UNITED STATES PATENTS

| | | |
|---|---|---|
| 27,022 | Lamb | Jan. 31, 1860 |
| 619,633 | Thompson | Feb. 14, 1899 |
| 878,912 | Timofeeff | Feb. 11, 1908 |
| 1,882,377 | Whittelsey | Oct. 11, 1932 |
| 1,931,248 | Bryant | Oct. 17, 1933 |
| 2,139,584 | Hunter | Dec. 6, 1938 |
| 2,163,860 | White | June 27, 1939 |
| 2,200,107 | Weitz | May 7, 1940 |
| 2,221,175 | Bechtold | Nov. 12, 1940 |
| 2,339,335 | Heckmanns | Jan. 18, 1944 |
| 2,498,480 | Bierlich | Feb. 21, 1950 |
| 2,579,732 | Funsten | Dec. 25, 1951 |
| 2,633,074 | Davis | Mar. 31, 1953 |
| 2,671,985 | Vogelsang | Mar. 16, 1954 |
| 2,749,590 | Kilpatrick | June 12, 1956 |

FOREIGN PATENTS

| | | |
|---|---|---|
| 107,958 | Austria | Nov. 25, 1927 |
| 109,751 | Australia | Feb. 22, 1940 |
| 146,084 | Australia | Apr. 17, 1952 |
| 939,885 | France | May 3, 1948 |
| 486,203 | Germany | Nov. 14, 1929 |
| 599,445 | Great Britain | Mar. 12, 1948 |

OTHER REFERENCES

Bulletin 617, published December 1937 by University of California, College of Agriculture, Berkeley, California, on "The Reclamation of Alkali Soils," 40 pages in all; only pages 8 through 11 are relied upon.

Washington (D. C.) Times-Herald, Sunday, June 9, 1940, page 4-D, article "Painting the Soil Black."

Life (Magazine), vol. 25, No. 16, pages 85, 86, 89 (Oct. 18, 1948) article "New Grass for the West."

Washington (D. C.) Post, Sunday, Aug. 7, 1949, Section 5, page 6-R, article "Carbon Black Hailed as Built-In Soil Heater."

Everson et al.: "Effect of Carbon Black . . . Soils," published May 1950 in Soil Science, vol. 69, No. 5, pages 369 through 376.